United States Patent [19]
Fletcher et al.
[11] 3,869,624
[45] Mar. 4, 1975

[54] PEAK HOLDING CIRCUIT FOR EXTREMELY NARROW PULSES

[76] Inventors: James C. Fletcher, Administrator of the National Aeronautics and Space Administration with respect to an invention of; Robert W. O'Neill, Houston, Tex.

[22] Filed: May 21, 1973

[21] Appl. No.: 362,146

[52] U.S. Cl. .............. 307/267, 307/229, 307/235 R, 328/58, 328/115, 328/151

[51] Int. Cl. .............. H03k 5/04

[58] Field of Search ............ 307/299, 235 R, 235 A, 307/264, 265, 267; 328/127, 58, 115, 150, 151

[56] References Cited

UNITED STATES PATENTS

| | | | |
|---|---|---|---|
| 3,363,113 | 1/1968 | Bedingfield | 307/235 R |
| 3,413,491 | 11/1968 | Reeves et al. | 307/235 A |
| 3,430,072 | 2/1969 | Stevens | 307/235 R |
| 3,479,534 | 11/1969 | Miller | 307/267 |
| 3,555,298 | 1/1971 | Neelands | 307/235 R |
| 3,701,909 | 10/1972 | Holmes et al. | 328/151 |
| 3,714,464 | 1/1973 | Nutt | 307/235 A |
| 3,753,132 | 8/1973 | Hill | 307/235 R |

OTHER PUBLICATIONS

"Stretching of Analogue Pulses," by Mundl in Electronic Engineering, Feb. 1969, pages 215–217.

"Peak Picking and Noise Suppression CKTRY," by Bjorkman et al., IBM Technical Disclosure Bulletin, Vol. 9, No. 6, Nov. 1966, pages 588–589.

"Scanner Reference System," by Keillor et al., IBM Tech. Disclosure Bulletin, Vol. 13, No. 6, Nov. 1970, pages 1541–1542.

*Primary Examiner*—Stanley D. Miller, Jr.
*Attorney, Agent, or Firm*—Marvin J. Marnock; Marvin F. Matthews; John R. Manning

[57] ABSTRACT

An improved pulse stretching circuit comprising: a high speed wide-band amplifier connected in a fast charge integrator configuration; a holding circuit including a capacitor connected in parallel with a discharging network which employs a resistor and an FET; and an output buffer amplifier. Input pulses of very short duration are applied to the integrator charging the capacitor to a value proportional to the input pulse amplitude. After a predetermined period of time, conventional circuitry generates a "dump pulse" which is applied to the gate of the FET making a low resistance path to ground which discharges the capacitor. When the dump pulse terminates, the circuit is ready to accept another pulse to be stretched. The very short input pulses are thus stretched in width so that they may be analyzed by conventional pulse height analyzers.

8 Claims, 1 Drawing Figure

PATENTED MAR 4 1975 3,869,624
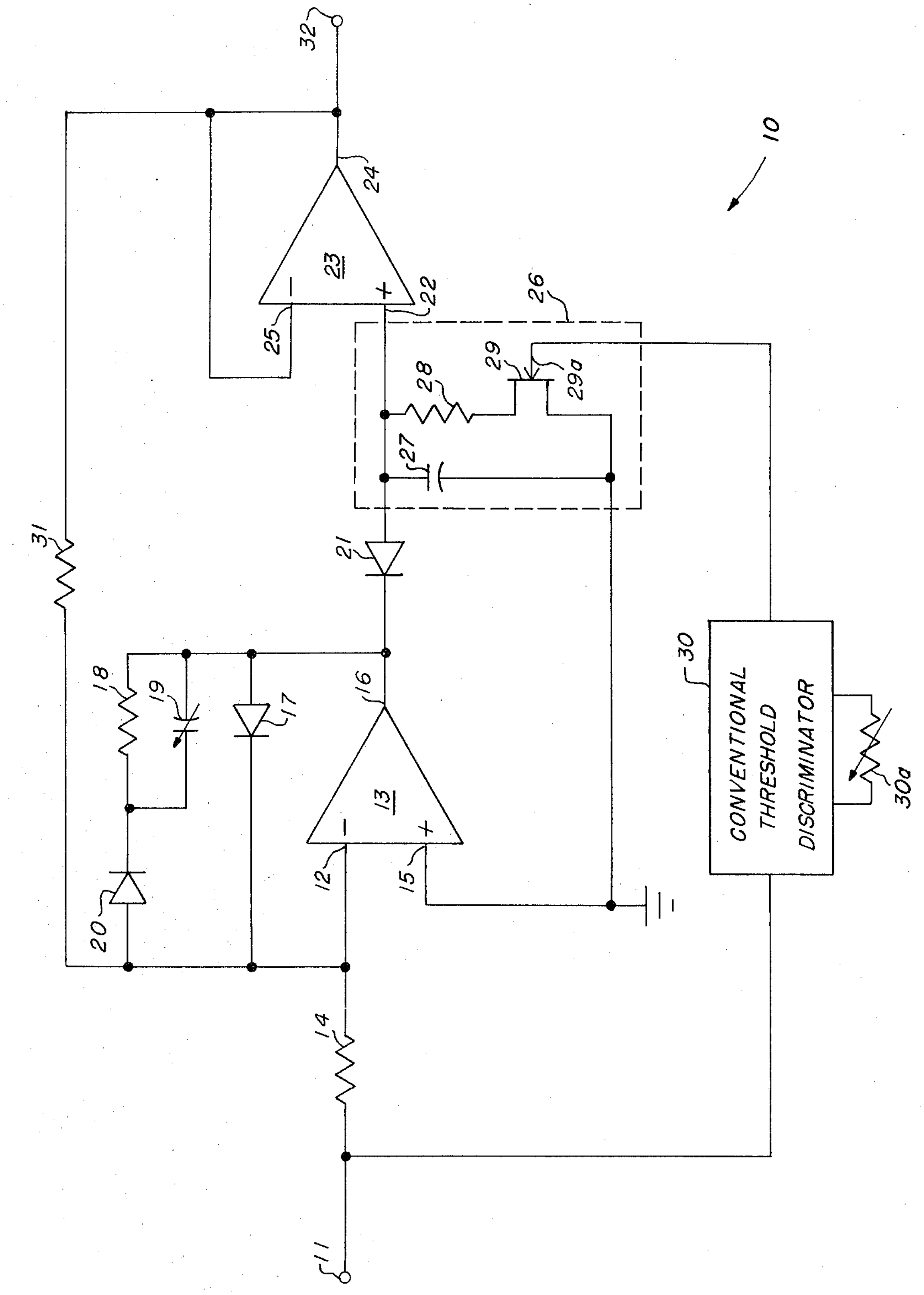

PEAK HOLDING CIRCUIT FOR EXTREMELY NARROW PULSES

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 45 U.S.C. 2457).

BACKGROUND OF THE INVENTION

1. Field of the Invention

The present invention relates to pulse stretchers, and more specifically to an improved pulse stretcher for accepting an input pulse having an extremely short time duration and producing an output pulse of a predetermined longer duration which can be analyzed with conventional pulse height analyzers.

2. Brief Description of the Prior Art

A problem encountered when using conventional pulse stretching circuits is that a varying frequency response is introduced during the stretching. Elimination of the frequency dependency of the circuit may often necessitate excessive compensation which can reduce the sensitivity of the circuit to very narrow pulses. In conventional systems, the frequency dependency is often caused by the varying time constant of the blocking diode employed between the amplifiers and charging capacitor employed in such systems.

In general, prior art circuits employed for pulse stretching have had either no compensating networks or have had such excessive compensation that the advantages gained in using modern high speed operational amplifiers have been destroyed.

SUMMARY OF THE INVENTION

The circuit of the present invention employs a wideband amplifier connected in a fast charge integrator configuration. The integration is provided by a feedback network which compensates for nonlinearities in the blocking diode employed to couple the input stage of the circuit to the following circuitry. The holding circuit which determines the output pulse width is regulated by a stable voltage controlled switching means.

With the described arrangement, the circuit of the present invention provides an improved pulse stretcher circuit which enables the analysis of pulses having up to one-tenth the pulse widths normally required by conventional pulse height analyzers. High speed, wideband amplifiers may be employed in the circuit of the present invention without need for excessive frequency compensation. As a result, the circuit of the present invention exhibits an improved response time and is usable over a wider range of frequencies.

In an exemplary embodiment, the circuit of the present invention can accept pulses as narrow as 50 nanosecond and stretch them as much as 2 microseconds or more. The circuit also has the capability of handling pulse widths having a range of from 50 to 3,200 nanoseconds.

Other features and advantages of the present invention will become more readily apparent from the following specification, the related drawings, and the claims.

BRIEF DESCRIPTION OF THE DRAWINGS

The FIGURE is a schematic diagram of the pulse stretching circuit of the present invention.

DESCRIPTION OF THE ILLUSTRATED EMBODIMENT

Referring to the drawing, the peak holding circuit of the present invention is indicated generally at 10. The circuit 10 has a signal input terminal 11 which is connected through a series input resistor 14 to the inverting input 12 of an operational amplifier 13. The non-inverting input 15 of the amplifier 13 is at ground potential. The output 16 of the amplifier 13 is connected to the anode of a clamping diode 17 which has its cathode connected to the input 12. A frequency compensating network comprising a parallel combination of a resistor 18 and a variable capacitor 19 is connected to the output 16 of the amplifier 13 and to the cathode of a diode 20 which has its anode connected to the input 12. As illustrated, the amplifier 13 is connected in a fast charge integrator configuration. The diode 20 compensates for nonlinearities of the diode 21.

The output 16 of the amplifier 13 is also connected to the cathode of a coupling diode 21, which has its anode connected to the non-inverting input 22 of a second operational amplifier 23. The amplifier 23 is connected in the unity gain configuration, having its output 24 connected directly to the inverting input 25.

Also connected with the input 22 of the amplifier 23 is a variable holding circuit 26 which includes a capacitor 27, a resistor 28, and a Field-Effect Transistor (FET) 29. The resistor 28 and the drain and source of the FET 29 are connected in series, between the input 22 and ground, and the capacitor 27 is connected in parallel with the resistor 28 and the FET 29. The gate *29a* of the FET 29 is connected to a conventional threshold discriminator circuit 30 that determines whether a valid pulse is present at the input to the system 10.

A feedback resistor 31 connects the output 24 of the amplifier 23 to the input 12 of the amplifier 13 and determines the gain of the circuit 10.

The stretched signal is present at a signal output terminal 32 which is connected to the output 24 of the amplifier 23. The signal at the terminal 32 may be supplied to the input terminal of a pulse height analyzer (not illustrated).

The peak holding circuit 10 of the present invention is intended primarily for use in conjunction with pulse height analyzers for analyzing the amplitudes of nuclear pulses which occur at random time intervals and are of short duration. In operation, the circuit 10 of the present invention is designed to accept and amplify only positive input pulses. If a negative pulse should appear at the input 11, the diode 17 prevents the output at 16 from swinging too far positive thus increasing the response time of the amplifier 13 by driving the gain toward unity. The output at 16 will be positive for a negative input and the diode 21 will be reversed biased preventing the signal from appearing at the input 22 to the amplifier 23.

When a valid positive signal is present at the terminal 11, the amplifier 13 will produce a negative output which will forward bias the diode 21 allowing the capacitor 27 to charge to a voltage proportional to the peak input voltage. After the capacitor is charged to the peak value, the input pulse is stretched by the circuit 26. The width of the pulse is determined by a manual setting, for example a variable resistor 30*a*, in the circuit 30. The circuit 30 generates a "dump pulse" when the signal has been stretched the length of time determined by the setting of resistor 30*a*. In operation, the dump pulse is used to turn on the FET 29 which essentially shorts the capacitor 27 to ground, thus discharging the capacitor.

The amplifier 23 acts as a buffer and is used to isolate the amplifier 13 as well as to drive auxiliary equipment. The output at 24 of the amplifier 13 is also connected to the resistor 31 which is connected to the input 12 of amplifier 13. The voltage gain of the circuit 10 is determined by the parallel combination of resistors 18 and 31 divided by resistor 14.

The electrical components identified in the following listing were employed in the construction of one embodiment of the circuit 10.

TABLE

| RESISTORS Reference Character | Rating In Ohms | CAPACITORS Reference Character | Rating In Picofarads |
|---|---|---|---|
| 14 | 1.2K | 19 | 18–28 adj. |
| 18 | 5.1K | 27 | 100 |
| 28 | 39.9 | | |

DIODE

| Reference Character | Manufacturer | Specification |
|---|---|---|
| 17 | Hewlett Packard | HPA 8082–2810 |
| 20 | Hewlett Packard | HPA 8082–2810 |
| 21 | Hewlett Packard | HPA 8082–2810 |

AMPLIFIERS

| Reference Character | Manufacturer | Specification |
|---|---|---|
| 13 | Intronics | A502 |
| 23 | National Semiconductor Corporation | NH0033 |

TRANSISTORS

| Reference Character | Manufacturer | Specification |
|---|---|---|
| 29 | Texas Instruments | N-Channel FET |

While the circuit of the present invention has been described for use with nuclear pulses, it will be appreciated that other usages of the invention are possible. Other usages and modifications are also within the purview of the invention and the foregoing disclosure and description of the invention is illustrative and explanatory thereof and various changes in the details of the illustrated construction may be made within the scope of the appended claims without departing from the spirit of the invention.

I claim:

1. A circuit for lengthening the time duration of an electrical pulse comprising:

a. first input amplifying means;

b. an integrating feedback loop connected between the output and one input of said amplifying means for frequency control;

c. coupling means connecting the output of said first amplifying means with one input of a second amplifying means;

d. compensating means included in said integrating feedback loop for compensating for nonlinear characteristics in said coupling means;

e. pulse width control means having an input supplied with said electrical pulse and an output applied to said second amplifying means for regulating the width of pulses output from said second amplifying means; and f. threshold discriminating means included in said pulse width control means for determining the presence of an electrical pulse having predetermined electrical characteristics at the input to said first amplifying means whereby only pulses having such predetermined characteristics have their widths regulated by said control means.

2. A circuit as defined in claim 1 wherein:

a. said first input amplifying means includes a differential input operational amplifier;

b. said feedback loop includes a first leg having a parallel RC circuit connected in series with a first diode and a second leg, in parallel with the first leg and including a second diode; and c. the anode of said first diode and the cathode of said second diode are connected to the inverting input of said first amplifying means.

3. A circuit as defined in claim 2 wherein:

a. said second amplifying means includes an operational amplifier connected in the unity gain configuration;

b. said coupling means includes a diode having its cathode connected to the output of said first amplifying means;

c. said pulse width control means includes a holding circuit formed by a charging capacitor connected in parallel with an FET controlled discharge circuit; and d. the output of said holding circuit is connected to the non-inverting input of said second amplifying means.

4. A circuit as defined in claim 3 wherein the output of said threshold discriminating means is connected to the gate of said FET for generating a dump pulse to discharge the charge on said charging capacitor.

5. A circuit as defined in claim 1 wherein the output of said second amplifying means is fedback to said first amplifying means.

6. A circuit as defined in claim 5 wherein:

a. said first input amplifying means includes a differential input operational amplifier;

b. said feedback loop includes a first leg having a parallel RC circuit connected in series with a first diode and a second leg, in parallel with the first leg and including a second diode; and c. the anode of said first diode and the cathode of said second diode are connected to the inverting input of said first amplifying means.

7. A circuit as defined in claim 6 wherein:

a. said second amplifying means includes an operational amplifier connected in the unity gain configuration;

b. said coupling means includes a diode having its cathode connected to the output of said first amplifying means;

c. said pulse width control means includes a holding circuit formed by a charging capacitor connected in parallel with an FET controlled discharge circuit; and d. the output of said holding circuit is connected to the non-inverting input of said second amplifying means.

8. A circuit as defined in claim 7 wherein the output of said threshold discriminating means is connected to the gate of said FET for generating a dump pulse to discharge the charge on said charging capacitor.

* * * * *